United States Patent Office 3,532,713
Patented Oct. 6, 1970

3,532,713
PROCESS FOR THE PRODUCTION OF ETHYLENE EPISULFIDE
Genevieve Lebrasseur, born Nicoud, Bully-les-Mines, France, assignor to Ethylene-Plastique, Paris, France, a French society
No Drawing. Filed Dec. 20, 1966, Ser. No. 603,107
Claims priority, application Great Britain, Dec. 23, 1965, 54,569/65
The portion of the term of the patent subsequent to June 3, 1986, has been disclaimed
Int. Cl. C07d 95/00
U.S. Cl. 260—327                7 Claims

ABSTRACT OF THE DISCLOSURE

A process is provided for preparing ethylene episulfide wherein carbon disulfide is reacted with ethylene oxide at a temperature of from 10 to 80° C. in the presence of a catalytic system. The catalytic system contains an alkali metal halide such as lithium, sodium or potassium iodide, lithium or sodium bromide or lithium chloride, water in an amount of from 2 to 12% by weight based on the amount of alkali metal halide present and a co-catalyst. The co-catalyst may be an alkylsulfonium halide or methanol.

---

This invention relates to a process for the production of ethylene episulfide by the reaction of ethylene oxide with carbon disulfide in the presence of a catalyst.

The reaction of ethylene oxide with carbon disulfide generally results in the formation of a mixture containing a large number of products. In this case, it is practically impossible to fractionate the mixture into its various constituents owing to the very large number of secondary reactions that may take place. In particular, if the mixture contains appreciable quantities of ethylene episulfide, it has never been possible to extract the latter because its tendency to spontaneous polymerisation is very great. To prepare ethylene episulfide in a high degree of purity, it has therefore hitherto been necessary to stop the condensation of carbon disulfide and ethylene oxide at an intermediate stage, that is at the stage of 1,3-oxathiolane-2-one or 1,3 - oxathiolane-2-thione, and then, after purification, to decompose these intermediate products under controlled reaction conditions.

We have now found that by using certain specific catalysts it is possible to prepare ethylene episulfide by the direct condensation of ethylene oxide and carbon disulfide. As will be described hereinafter, a mixture is obtained which is very rich in episulfide and from which the episulfide can be recovered in the pure state by conventional physico-chemical operations.

The catalyst mixtures used consist of a moist or hydrated alkali metal halide selected from the following: lithium, sodium or potassium iodide, lithium or sodium bromide, or lithium chloride, and a co-catalyst which is an alkylsulfonium halide or a polar solvent, preferably an alcohol, which is a good solvent for the alkali metal halide used.

The amount of water present in the catalytic mixture should not be excessive and is preferably from 2 to 12%, advantageously 5 to 11%, by weight with respect to the halide.

If the co-catalyst is an alkylsulfonium halide, it is preferred to use an alkylsulfonium iodide; the amount of this co-catalyst in the catalytic system must be small with respect to the alkali metal halide used, and preferably about 1 mole of alkylsulfonium iodide is used per 10 moles of alkali metal halide.

If the co-catalyst used is a polar solvent, it is again desirable to use only small quantities of it since an excess of the solvent promotes the development of secondary reactions, and more particularly the polymerisation of the episulfide formed. It is preferred, in fact, to use only slightly more of the polar solvent than is required to dissolve the alkali metal halide.

The preferred reaction temperature is from 10 to 80° C.; if the reaction temperature is below 10° C., the speed of the reaction is extremely slow and becomes industrially unusuable; if, on the other hand, the temperature used is greater than 80° C., the reaction becomes less stable and is likely to be explosive and secondary reactions develop in the mixture and tend to reduce the yield.

In order that the invention may be more fully understood, the following examples are given by way of illustration only:

EXAMPLE 1

3 moles of ethylene oxide and 1 mole of carbon disulfide were introduced into an autoclave maintained at a temperature of 0° C. Hydrated lithium chloride and an alkylsulfonium halide were added.

The autoclave was closed and the mixture was reacted at 25° C. for 15 hours. The autoclave was then cooled to 0° C. and vented and the reaction mixture in the autoclave was collected and analyzed by gas-phase chromatography.

The experimental conditions used and the results obtained are shown in Table 1.

TABLE 1

| No. of moles of— | | Products obtained in mole per mole of converted carbon disulfide | | |
|---|---|---|---|---|
| LiCl contg. 11% H₂O | Triethyl sulfonium iodide | Ethylene episulfide | Ethylene monothio-carbonate | Ethylene dithio-carbonate |
| 0.05 | 0.005 | 0.69 | 0.196 | 0.63 |
| 0.1 | 0.01 | 0.79 | 0.31 | 0.48 |
| 0.3 | 0.03 | 1.61 | 0.262 | ------ |
| 0.4 | 0.04 | Partial polymerisation | | |
| 0.05 | 0.01 | 0.266 | 0.074 | 0.60 |

The results given in Table 1 show that all other things being equal, the parallel increase in the lithium chloride and triethylsulfonium iodide concentrations has an increasingly favourable effect on the formation of ethylene episulfide. With an excessive concentration of the catalyst and/or an excessive reaction time the episulfide formed is subjected to secondary polymerisation reactions, and an unduly low lithium chloride/sulfonium iodide molar ratio results in a reduction of the episulfide yield.

EXAMPLE 2

Processes similar to those described in Example 1 were carried out with the following:

3 moles of ethylene oxide,
1 mole of carbon disulfide,
0.03 mole of trimethylsulfonium iodide,
0.3 mole of 11%-hydrated lithium chloride, with a reaction time of 6 hours at varying temperatures. The results obtained are shown in Table 2.

TABLE 2

| | Products obtained in mole per mole of converted carbon disulfide | | |
|---|---|---|---|
| | Ethylene episulfide | Ethylene monothio-carbonate | Ethylene dithio-carbonate |
| Reaction temperature, ° C.: | | | |
| 40 | 1.153 | 0.175 | 0.100 |
| 50 | 1.458 | 0.20 | 0.030 |
| 60 | 1.718 | ------ | ------ |

It will be seen that an increase in the temperature leads to an increase in the overall speed of the reaction and a higher ethylene episulfide yield. A temperature above 80° C. is not desirable because it results in a fall in the yield, probably due to polymerisation of the episulfide.

EXAMPLE 3

The following were reacted in the manner described in Example 1:

3 moles of ethylene oxide,
1 mole of carbon disulfide,
0.03 mole of ethyldimethylsulfonium iodide,
0.3 mole of 11%-hydrated lithium chloride, with a reaction time of 6 hours and a temperature of 40° C.

Under these conditions the following were obtained in moles per mole of converted carbon disulfide:

1.916 moles of ethylene episulfide,
0.08 mole of ethylene monothiocarbonate.

The final reaction mixture was in the form of a pale yellow pasty liquid and was taken from the autoclave at 0° C. and transferred to a distillation flask. The latter was provided with a magnetic agitator, thermometer and distillation bridge. The mixture of ethylene oxide and episulfide which was collected at −30° C. was not subjected to fractional distillation in the real sense, but to rapid degasification.

In a first degasification at 30° C., 77 g. of a mixture containing 23.7% of episulfide and 76.3% of ethylene oxide were collected; after heating to about 105° C., 95.2 g. of a mixture containing 56.3% of episulfide, 42.2% of ethylene oxide and 1% of carbon disulfide were collected. In this way 67% of the episulfide contained in the final reaction mixture were recovered. The mixture of ethylene oxide and episulfide could be readily fractionated by a fresh distillation.

EXAMPLE 4

Using the procedure described in Example 1, 0.8 mole of ethylene oxide and 0.2 mole of carbon disulfide were reacted for 16 hours at 25° C. in the presence of a catalyst consisting of 5% hydrated lithium chloride and trimethylsulfonium iodide.

The results obtained are shown in Table 3:

TABLE 3

| Catalyst (in moles) | | Products obtained in mole per mole of converted carbon disulfide | | |
|---|---|---|---|---|
| Hydrated LiCl | Trimethyl- sulfonium iodide | Ethylene episulfide | Ethylene monothio- carbonate | Ethylene dithio- carbonate |
| 0.02 | 0.001 | 0.8 | 0.38 | 0.27 |
| 0.02 | 0.002 | 0.920 | 0.35 | 0.12 |
| 0.02 | 0.003 | 1.180 | 0.56 | 0.10 |

EXAMPLE 5

The following were reacted for 3 hours at a temperature of about 30° C.:

1 mole of carbon disulfide,
2.5 moles of ethylene oxide, in the presence of 0.01 mole of 10% hydrated sodium iodide in 6 cc. of methanol.

After reaction, the mixture obtained contained ethylene monothiocarbonate and ethylene episulfide in addition to ethylene oxide. The yield of the reaction was:

1.66 moles of episulfide per mole of converted carbon disulfide,
0.1 mole of monothiocarbonate per mole of converted carbon disulfide.

EXAMPLE 6

The following were reacted for 3 hours at a temperature of not more than 65° C.:

1 mole of carbon disulfide,
1.5 moles of ethylene oxide, in the presence of 6 cc. of methanol containing 0.04 mole of 10% hydrated lithium chloride.

The reaction mixture was then heated from 60° C. to 140° C. in 4 hours while distillation was carried out; during this heating period about 4 moles of ethyleneoxide were added drop by drop.

225 g. of distillate were collected containing 25% of episulfide (i.e. a yield of 0.93 mole of episulfide per mole of converted carbon disulfide) and substantially equal amounts of carbon oxysulfide and ethylene oxide.

I claim:
1. A process for the preparation of ethylene episulfide comprising reacting carbon disulfide with ethylene oxide at a temperature of from 10 to 80° C. in the presence of a catalytic system consisting of an alkali metal halide selected from the group consisting of lithium iodide, sodium iodide, potassium iodide, lithium bromide, sodum bromide and lithium chloride, water in an amount of from 2 to 12% by weight based on the amount of alkali metal halide present and a co-catalyst selected from the group consisting of an alkyl-sulfonium halide and methanol, and recovering said ethylene episulfide from the reaction mixture.

2. The process of claim 1 wherein the water is present in an amount of from 5 to 11% by weight with respect to the amount of alkali metal halide present.

3. The process of claim 1 wherein the co-catalyst is an alkylsulfonium halide selected from the group consisting of trimethylsulfonium iodide and triethylsulfonium iodide.

4. The process of claim 3 wherein approximately one mole of alkylsulfonium halide is present for every 10 moles of alkali metal halide present.

5. The process of claim 1 wherein the co-catalyst is methanol.

6. The process of claim 1 wherein the alkali metal halide is selected from the group consisting of lithium chloride and sodium iodide.

7. The process of claim 1 wherein the ethylene episulfide formed is recovered by progressively heating the reaction mixture formed to about 150° C. in the presence of an excess of ethylene oxide.

References Cited

UNITED STATES PATENTS 3,073,846  1/1963  Millikan _____ 260—327
3,347,867  10/1967  Osborn et al. _____ 260—327

JAMES A. PATTEN, Primary Examiner